Dec. 25, 1934.  A. R. AYERS ET AL  1,985,711
TENDER FRAME STRUCTURE
Filed July 6, 1931    11 Sheets-Sheet 1
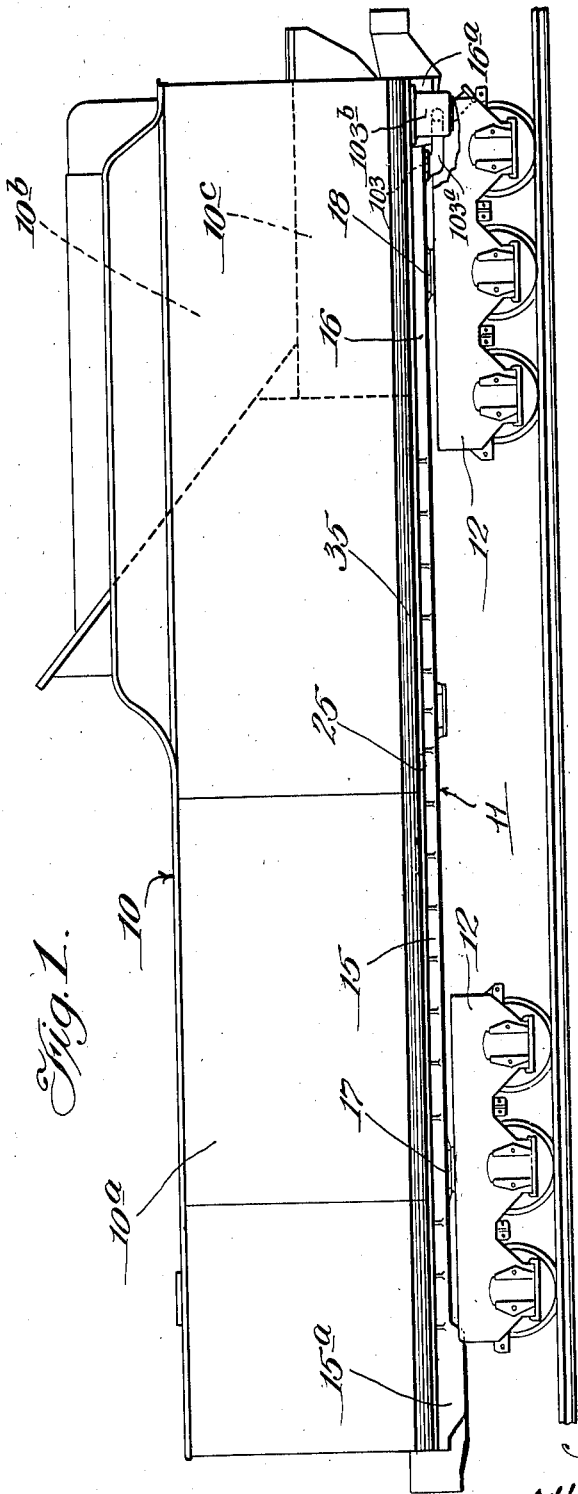
Inventor:
Augustine R. Ayers and
George S. Vail.
By Offield Towle Scott & Poole Atty.

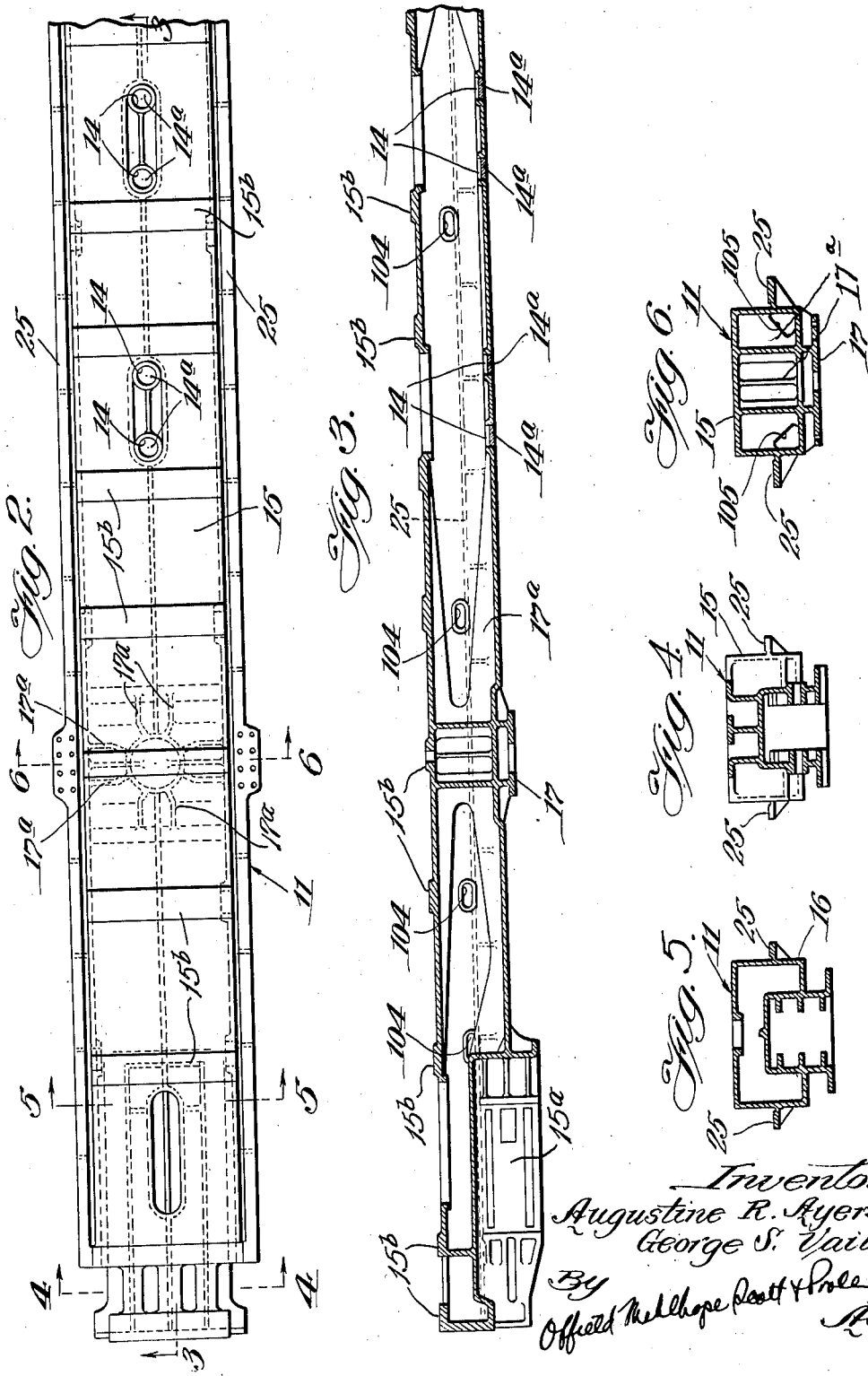

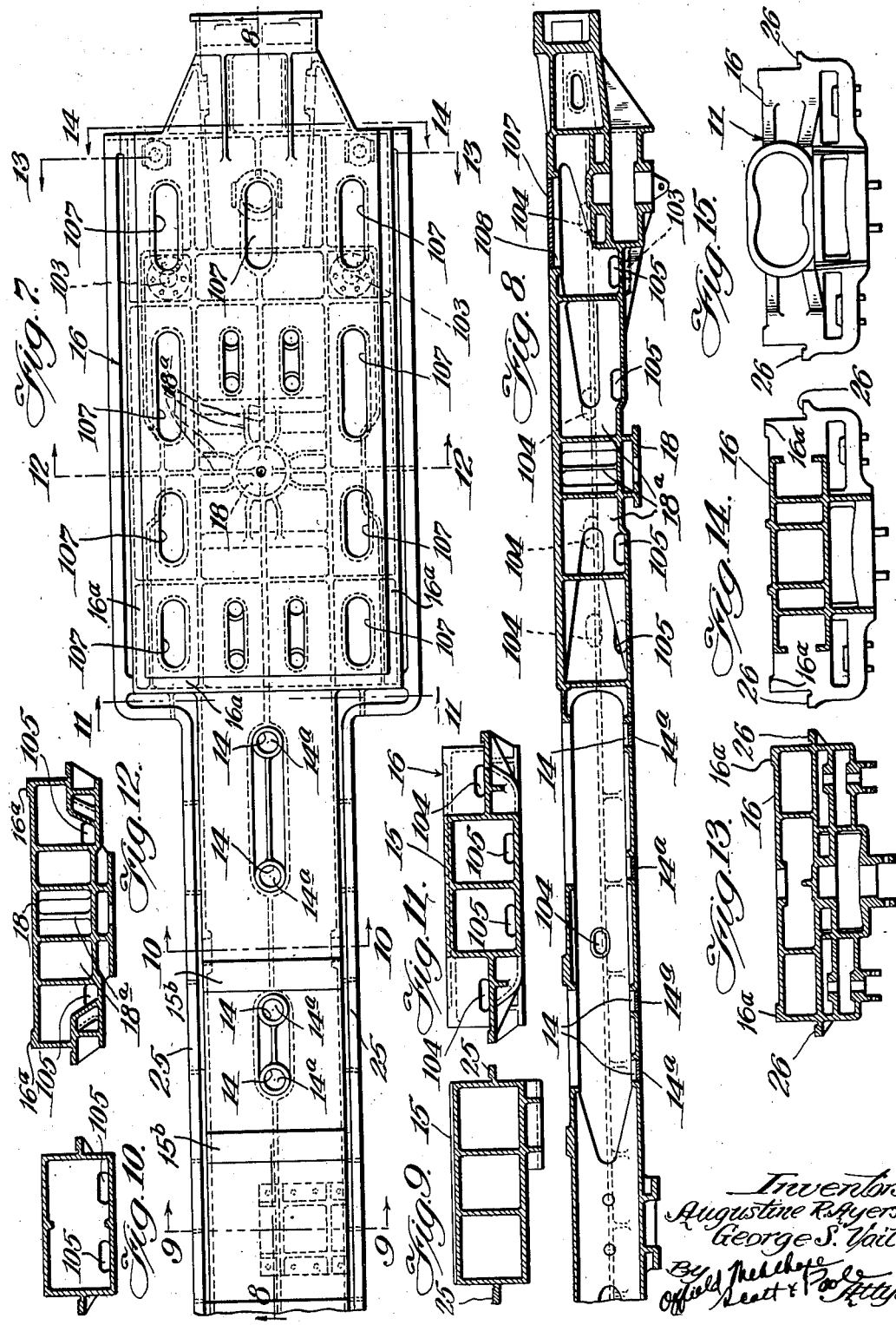
Dec. 25, 1934.  A. R. AYERS ET AL  1,985,711
TENDER FRAME STRUCTURE
Filed July 6, 1931  11 Sheets-Sheet 3

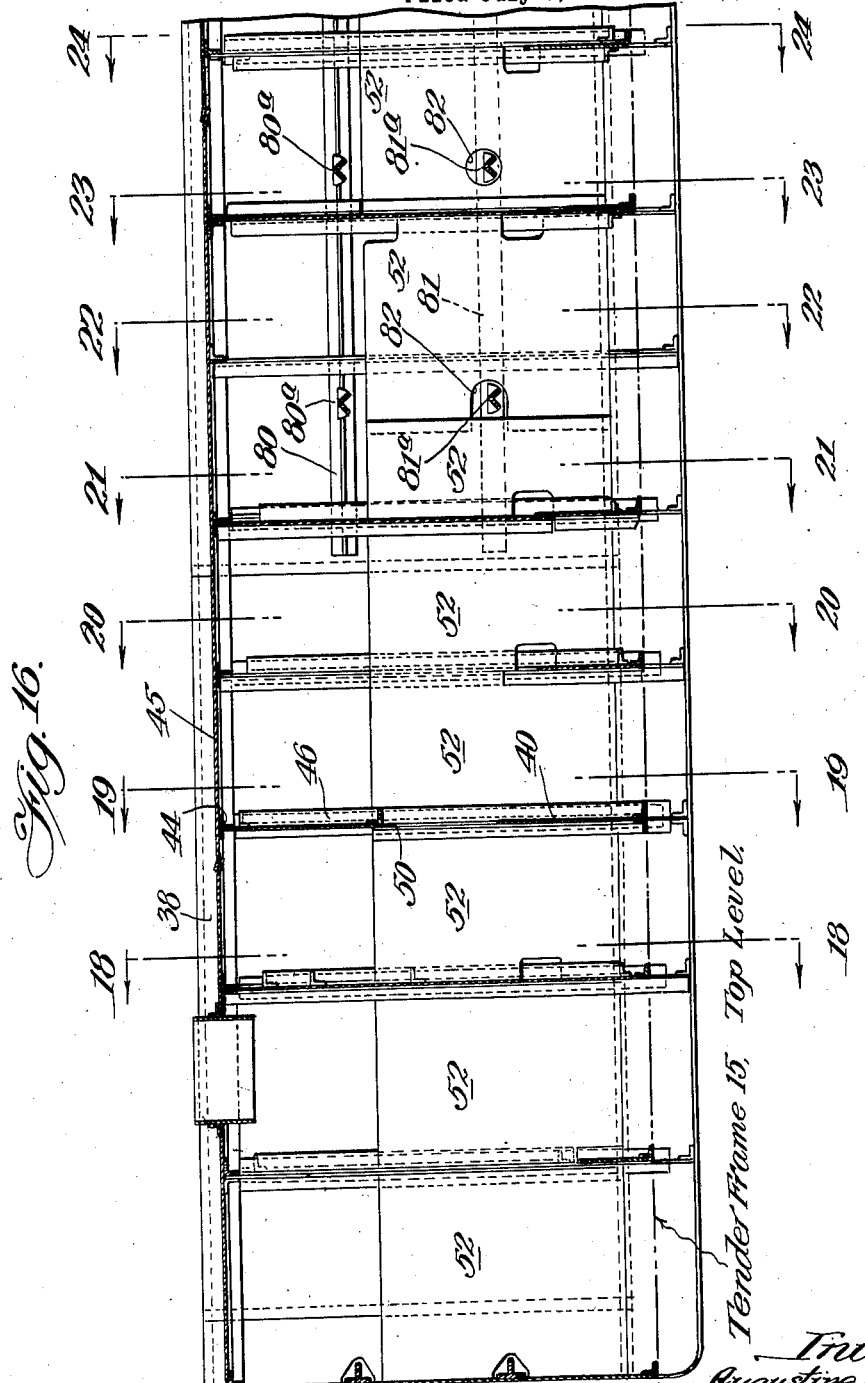

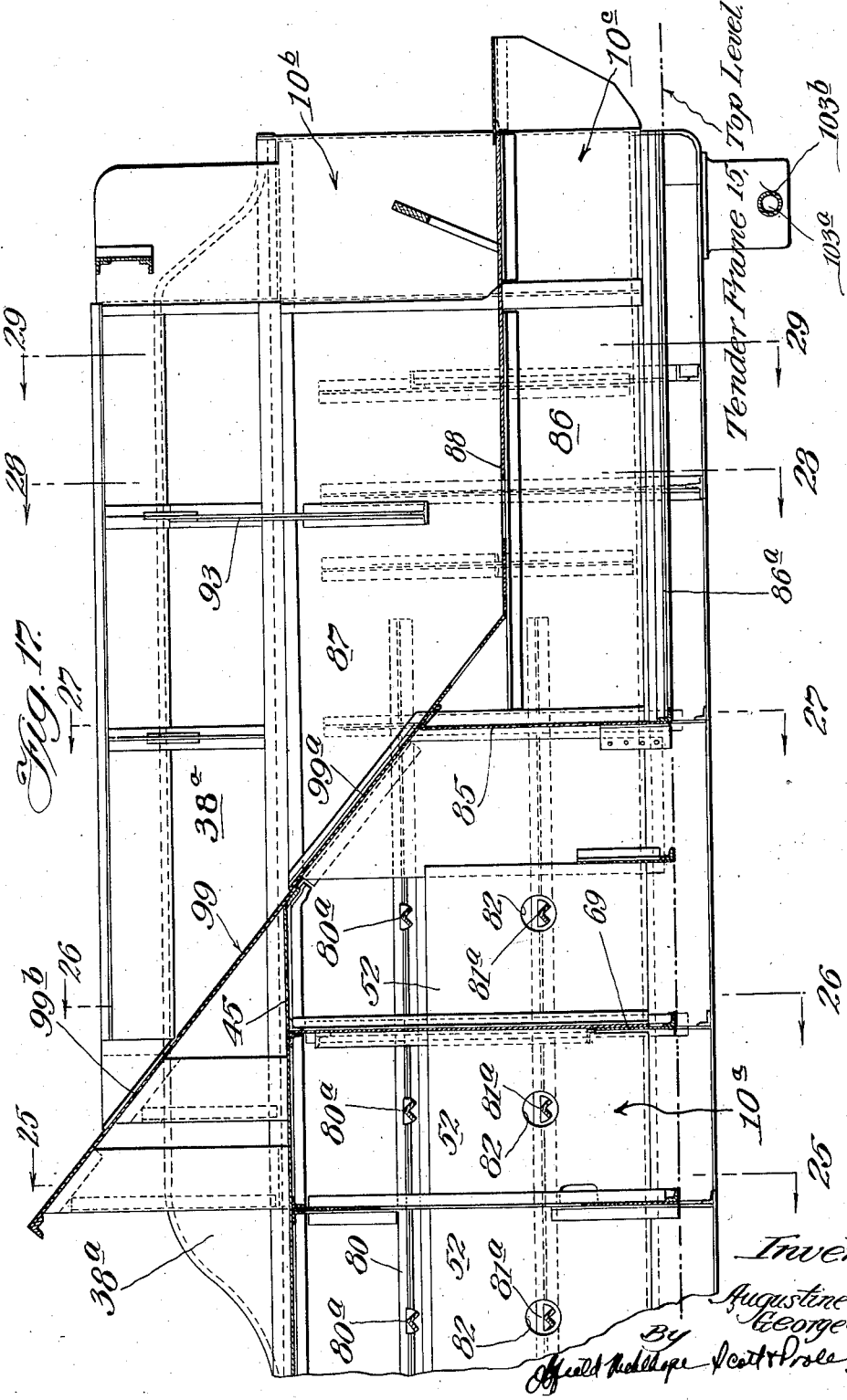

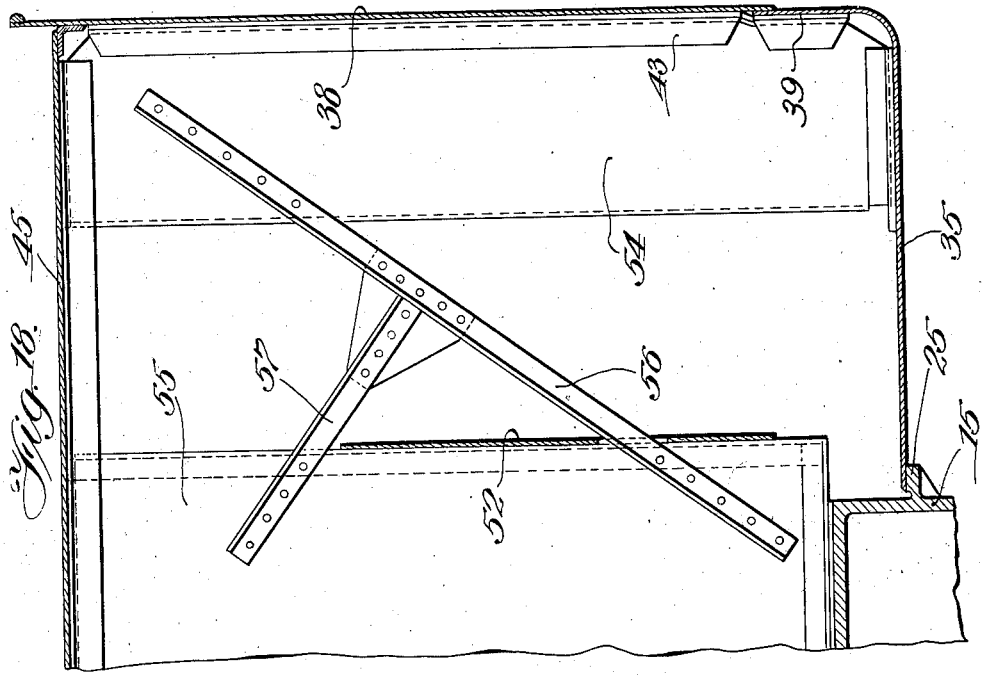
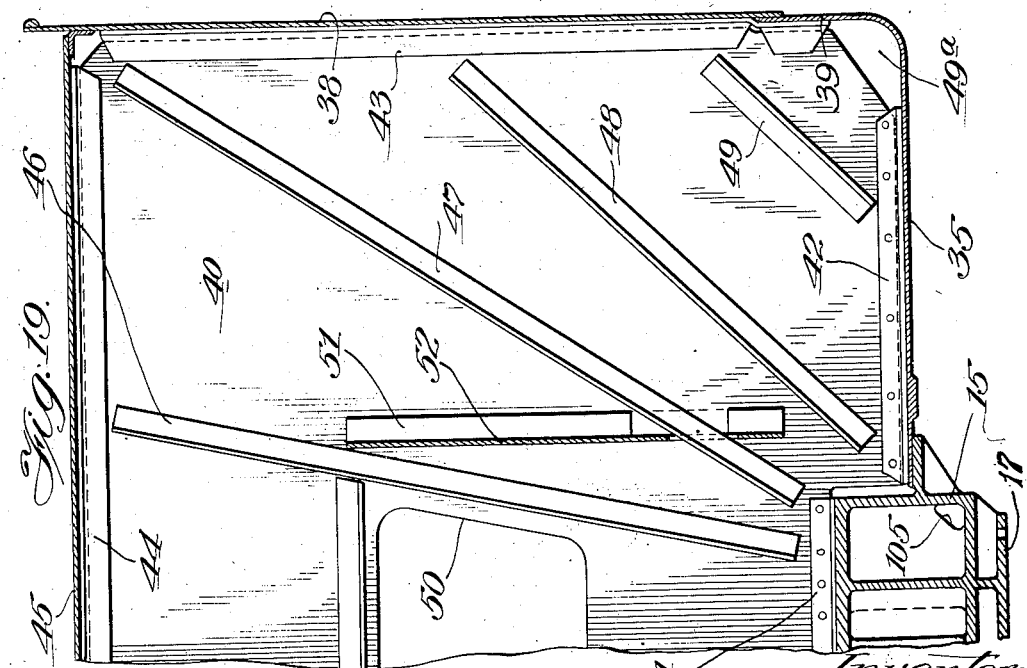

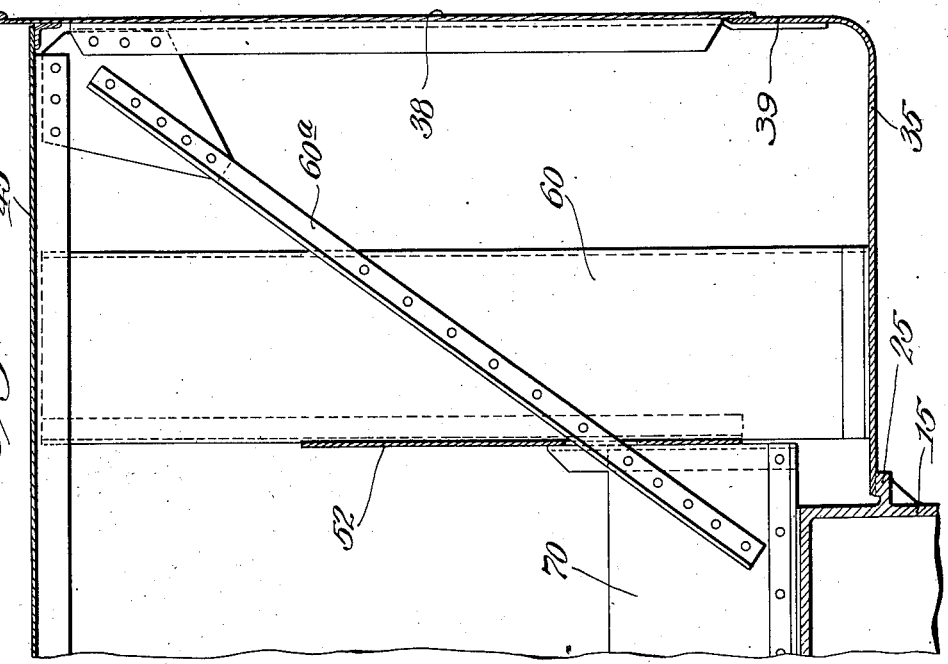
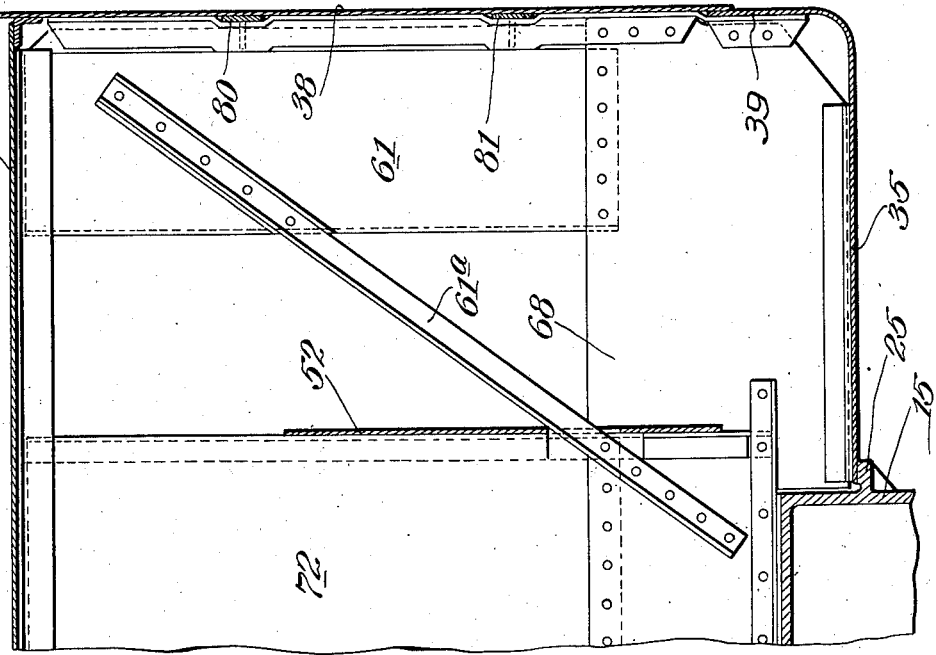

Dec. 25, 1934.  A. R. AYERS ET AL  1,985,711
TENDER FRAME STRUCTURE
Filed July 6, 1931  11 Sheets-Sheet 8
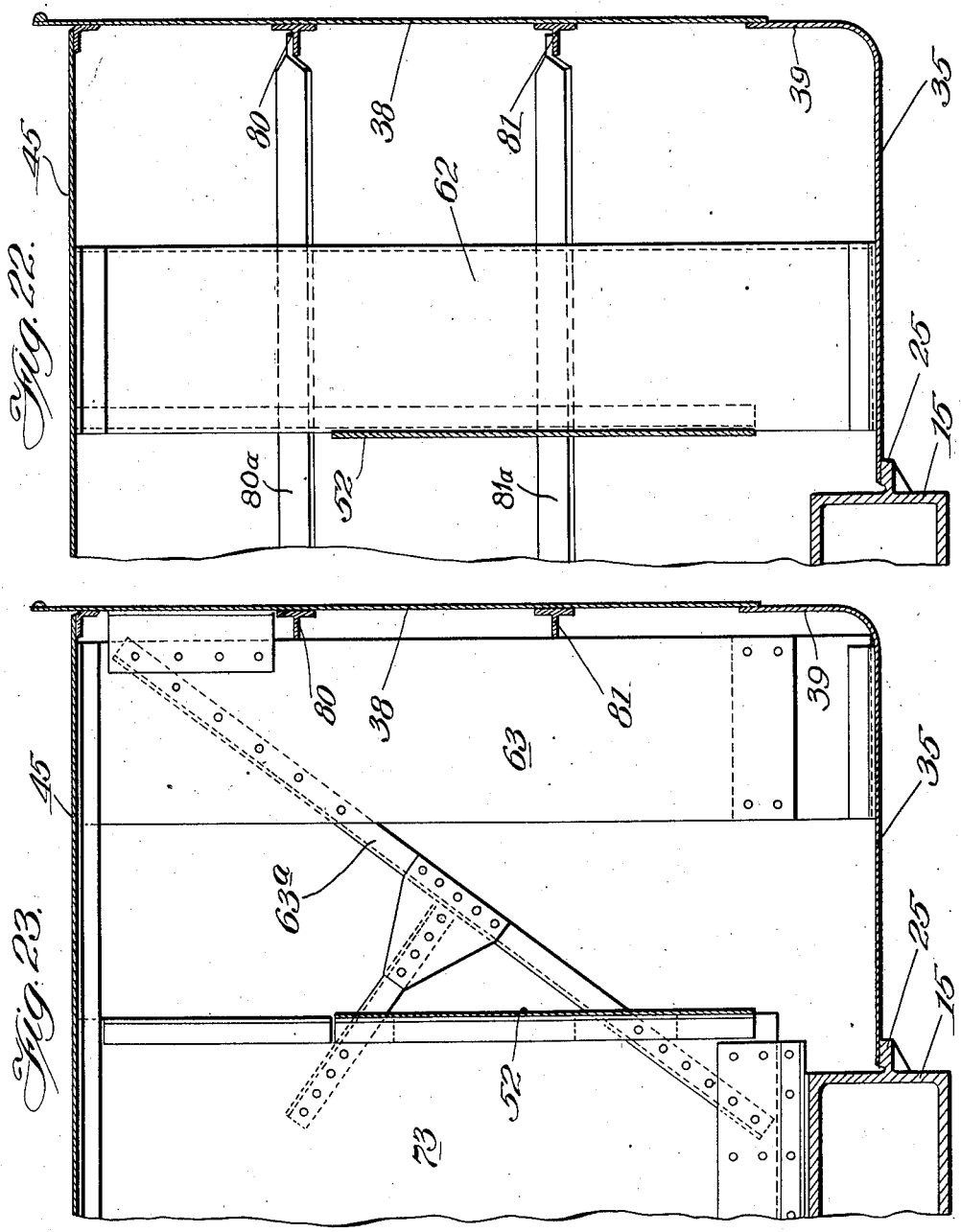

Dec. 25, 1934. A. R. AYERS ET AL 1,985,711
TENDER FRAME STRUCTURE
Filed July 6, 1931 11 Sheets-Sheet 9
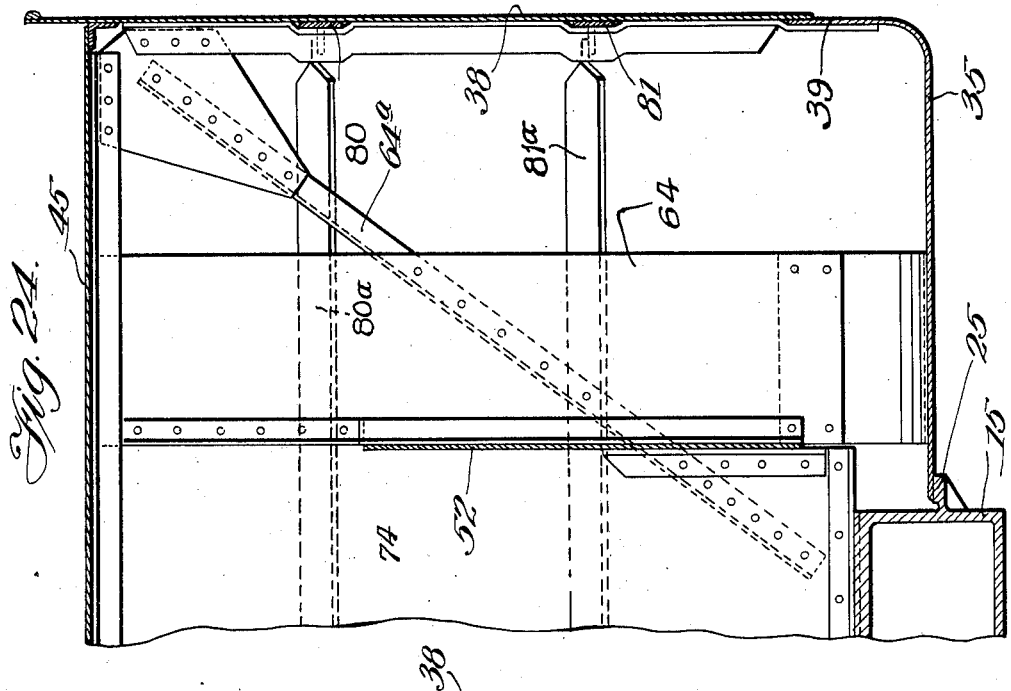
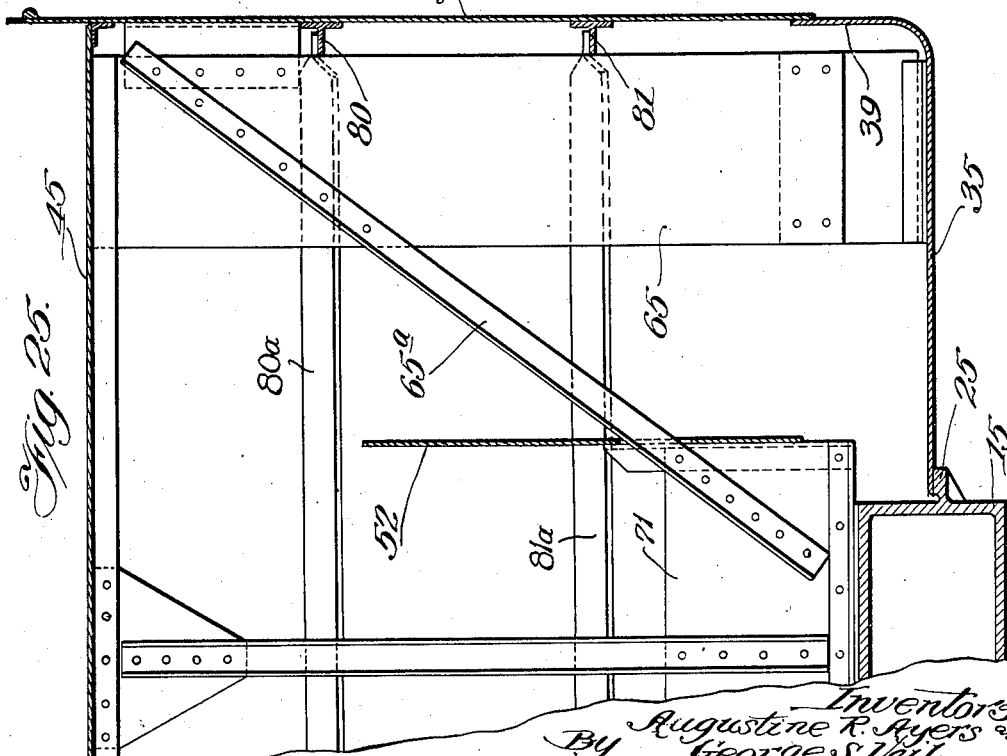
Inventors:
Augustine R. Ayers and
George S. Vail
By Offield Neubhope Scott & Hole Attys

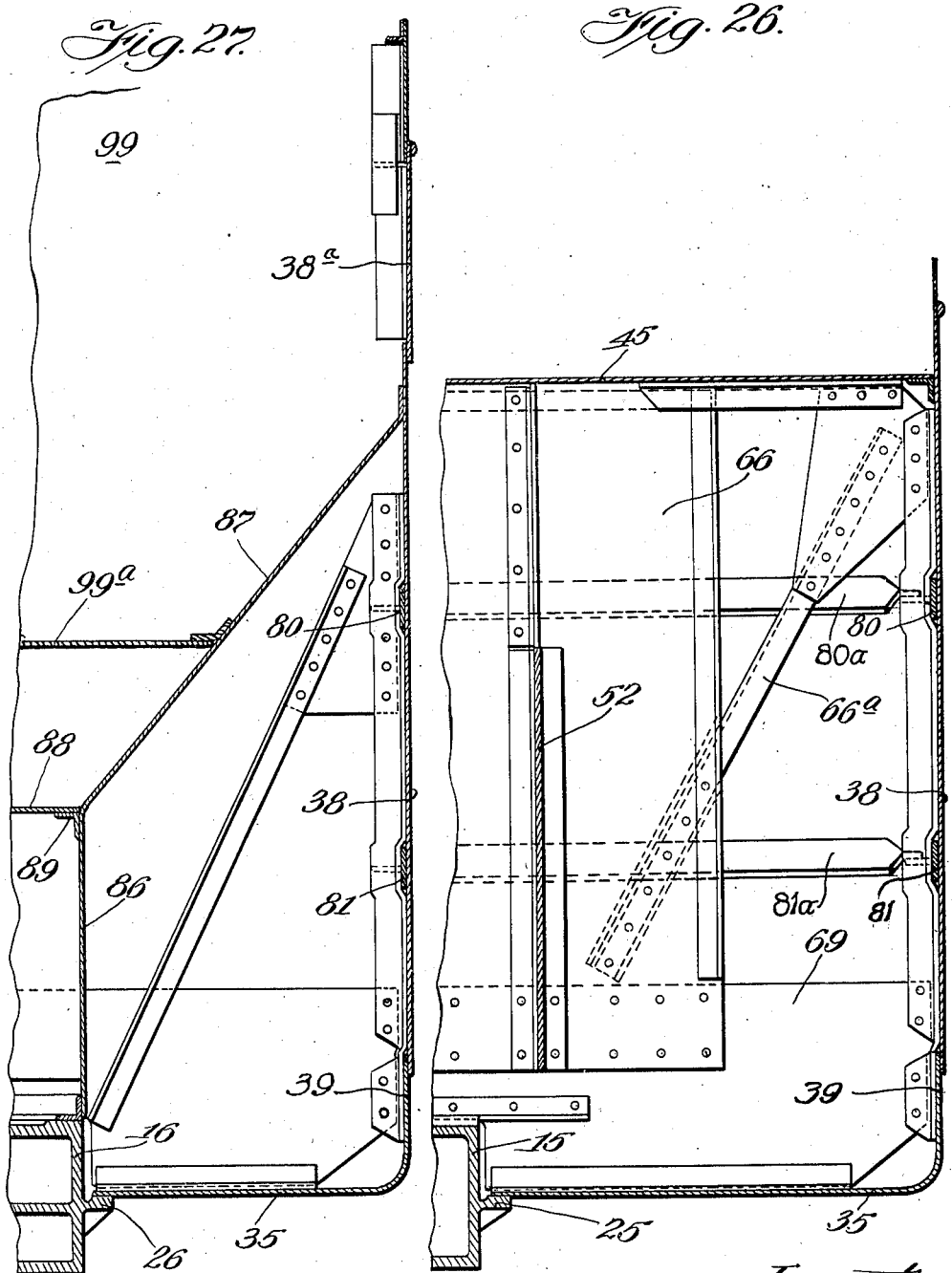

Dec. 25, 1934.　　　A. R. AYERS ET AL　　　1,985,711
TENDER FRAME STRUCTURE
Filed July 6, 1931　　　11 Sheets-Sheet 11

Patented Dec. 25, 1934

1,985,711

UNITED STATES PATENT OFFICE 1,985,711

TENDER FRAME STRUCTURE

Augustine R. Ayers and George S. Vail, Cleveland, Ohio

Application July 6, 1931, Serial No. 548,802

23 Claims. (Cl. 105—231)

This invention relates to improvements in locomotive tender frame and tank constructions. As heretofore constructed, locomotive tenders have been provided with cast steel main frames upon which the tank body is directly supported, and more recently such main frames have been more or less skeletonized so as to include only a centrally disposed longitudinal beam and transversely disposed bolsters and sills formed integral therewith, upon which the tank body is supported.

In carrying out our invention, we provide an improved construction of tender frame and tank body of the skeletonized type above described, wherein the main frame consists only of a single longitudinal beam without bolsters or end sills, the front end portion being of approximately the same length and width as the stokerwell of the tank, and the portion of the frame back of the stokerwell to the extreme end being narrower than the stokerwell and only a small part of the width of the tank. The bottom plates of the tank are connected directly to the sides of the frame members considerably below the top thereof, so as to reduce the center of gravity of the entire tank. The side plates or girders braced by transverse and diagonal struts from the center frame, provide the desired support for the overhanging portions of the tank.

Other objects of the invention will appear from time to time as the following description proceeds.

In the drawings,

Figure 1 is a side view of a locomotive tender constructed in accordance with my invention.

Figure 2 is a plan view of the rear end of the main frame casting.

Figure 3 is a section taken on line 3—3 of Figure 2.

Figure 29:
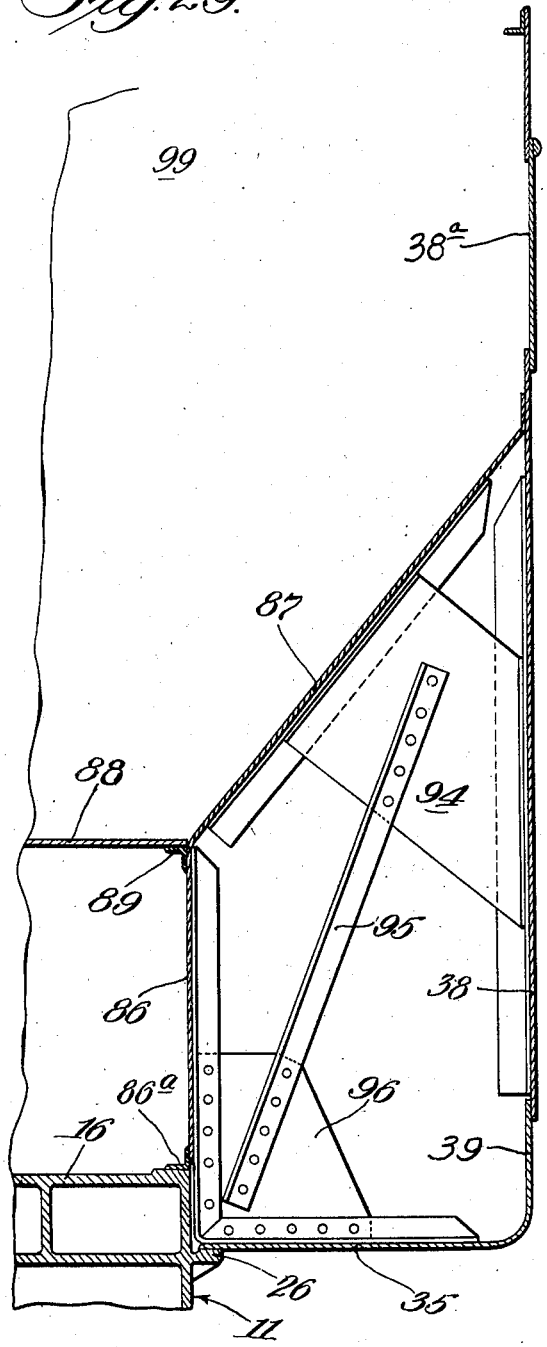

Figures 4, 5 and 6 are transverse sections taken on lines 4—4, 5—5 and 6—6, respectively, of Figure 2.

Figure 7 is a plan view of the front portion of the main frame casting. This figure constitutes a continuation of the casting shown in Figure 2.

Figure 8 is a longitudinal section taken on line 8—8 of Figure 7.

Figures 9, 10, 11, 12, 13 and 14 are transverse sections taken on lines 10—10, 11—11, 12—12, 13—13 and 14—14, respectively, of Figure 7.

Figure 15 is a front end view of the main frame casting shown in Figure 7.

Figure 16 is a section taken on the longitudinal center line of the rear end of the tank superstructure and with the main frame casting removed.

Figure 17 is a view similar to Figure 16, but showing the front end of the tank.

Figures 18, 19, 20, 21, 22, 23 and 24 are transverse sections taken on lines 18—18, 19—19, 20—20, 21—21, 22—22, 23—23 and 24—24, respectively, of Figure 16, but with the main frame casting in place.

Figures 25, 26, 27, 28 and 29 are transverse sections taken on lines 25—25, 26—26, 27—27, 28—28 and 29—29, respectively, of Figure 17, but with the main frame casting in place.

Referring now to details shown in the drawings, the locomotive tender shown in Figure 1 comprises a tank 10 supported on main frame 11, which in turn is supported on trucks 12, 12 which may be of any suitable construction. The tank 10 shown herein is of the usual two-compartment type, the rear compartment 10$^a$ being for water, and the front compartment 10$^b$ for coal. A third compartment or stokerwell 10$^c$ is provided beneath the coal compartment adapted for use either for containing automatic stoking apparatus, or as additional water space, as will hereinafter more fully appear.

The main frame 11 consists of a centrally disposed longitudinal beam 15 extending the length of the tender and having an enlarged or widened portion 16 at its front end of substantially the same width and length as the stokerwell 10$^c$.

The central beam 11 is preferably of hollow box girder construction and is provided with the usual means for draft connections at opposite ends, which need not be described in detail excepting to point out that the rear and front end portions 15$^a$ and 16$^a$ of the center beam 15 are offset downwardly below the ends of the main frame 11. The core holes 14, 14 at the bottom of the central beam casting are closed by plates 14$^a$, 14$^a$ to form a water passage, as will hereinafter more fully appear.

Bearing means are provided for swiveling the trucks 12, 12, the bearing for the rear truck being indicated at 17, and reinforced by transverse and longitudinal upright ribs 17$^a$, 17$^a$, as shown in Figures 2, 3 and 6, while the forward truck bearing 18 is shown in Figures 7, 8 and 12, said bearing being disposed in the widened portion 16 beneath the stokerwell and being reinforced by transverse and longitudinal upright ribs 18$^a$, 18$^a$. Especial provisions are also made for reinforcing the interior of the tank at these bearing points, as will hereinafter more fully appear.

Along the lateral side walls of the main beam 15 and continued along the side walls of the enlarged portion 16 are formed continuous horizontal flanges or projections 25, 25 which are considerably below the upper surface of the beam, herein being substantially midway between the upper and lower surfaces of said beam. These flanges are adapted to have their upper surfaces machined in a planing operation so as to permit the bottom plates of the tank to be secured thereto.

The tank body is built up on the main beam by riveting or welding horizontally disposed plates 35, 35 along the flanges 25, 25 at each side of said main beam. With this construction the rear beam portion 15 forms a part of the tank bottom, but the upper portion of said beam portion projects substantially above the bottom plates 35, 35 of the tank, as clearly shown in the several transverse sections. In order to support the overhanging portions of the tank and provide the desired strength and rigidity thereof, we provide a tank superstructure including side plates or girders 38, 38, and a series of diagonally extending braces and transversely extending bulkheads, all secured to and braced from the central beam 15 at the rear end of the tender, and the stoker-well structure at the front end thereof.

Referring now to the superstructure within the water tank portion 10$^a$ at the rear end of the frame, the superstructure includes the two side walls or girders 38, 38 riveted or welded to upstanding flanges 39, 39, herein formed integrally with the bottom plates 35, 35. Various transverse bracing structures are employed, depending upon the strength requirements at several points along the water tank. For instance, in Figure 19 it will be noted that immediately above the rear truck bearing 17, we provide a transversely extending, rigid plate or bulkhead 40, 40, extending the full width and height of the tank, and welded or riveted to angle irons 41 secured to the top of the beam 15, angle irons 42 secured to the bottom plates 35, angle irons 43 secured to the side walls 38, and angle irons 44 secured to the top wall 45 of the tank. The plate 40 is further reinforced by a series of diagonally extending angle irons 46, 47, 48 and 49 secured to said plate and arranged on lines extending in a generally diagonal direction toward the main frame as shown. The lower outside corner of the plate 40 is preferably cut away so as to form an aperture 49$^a$ to permit a limited passage of water from one side of the plate to the other. An aperture 50 is also formed in the center of the plate midway between the top and bottom of the tank for a similar purpose.

A pair of angle irons 51, 51 are also secured to the plate 40 in upright position, each of said angle irons being spaced slightly beyond the side margins of the central beam 15 and having a longitudinally extending baffle plate 52 connected thereto which has its lower margin slightly above the level of the beam 15 and its upper margin substantially below the top plate 45, as clearly shown in Figure 19. These baffle plates 52 are arranged to limit excessive transverse wave motion of the water within the tank. Similar baffle plates 52, 52 are arranged between adjacent transverse brace structures in the water tank to form continuous upright baffles throughout the length of said tank, and disposed parallel to both sides of the central beam 15, as shown in the several sections, Figures 18 to 26, both inclusive.

The transverse brace structure immediately to the rear of the plate 40 is shown in Figure 18, and comprises an upright plate 54 connected along each side wall 38 and between the bottom and top plates 45 and 35, respectively, but extending only a partial distance to the center beam and longitudinal baffle 52. A centrally disposed upright plate 55 extends vertically between the top plate 45 and the main frame beam 15, and horizontally between the two longitudinal baffle plates 52, 52. The plates 55 are connected to each of the plates 54 by a diagonal brace 56 passing through the baffle plates 52, and an intersecting brace 57 also connects the plate 55 with the diagonal brace 56 as shown.

The transverse brace structures to the front of the rigid brace structure shown in Figure 19 are shown in Figures 20 to 25. As will be seen from these figures, the space between each of the longitudinal baffles 52 and the side wall 38 is provided with an upright baffle extending about one-half of the width of said space, said upright baffles being arranged in staggered relation so that they are alternately adjacent the baffle 52 and the side plate 38. Thus, in the section shown in Figure 20, the upright baffle 60 is arranged adjacent and connected to the longitudinal baffle plate 52; in the next transverse brace structure shown in Figure 21, the upright baffle plate 61 is arranged adjacent and connected to the side plate 38. In the section shown in Figure 22, the upright plate 62 is connected to the longitudinal baffle plate 52, while in Figure 23 the upright baffle plate 63 is again arranged adjacent the side plate 38. Similarly, in the next three transverse sections shown in Figures 24, 25 and 26, the upright baffle plates 64, 65 and 66 are arranged alternately adjacent the baffle 52 and the side plate 38. This staggered relation of the upright baffle plates on each side of the tank minimizes longitudinal wave action of the water therein.

We also provide transversely extending baffle plates in the bottom of the tank, as for instance, in the sections shown in Figures 21 and 26, baffle plates 68 and 69 are connected along the bottom plate 35 and extend upwardly approximately one-third of the height of the tank, where they are connected to the upright baffles 61 and 66, respectively.

It will be observed further that in connection with each of the upright baffles 60, 61, 63, 64 and 65, diagonal braces 60$^a$, 61$^a$, 63$^a$, 64$^a$ and 65$^a$, respectively, are provided extending from the outer corner formed between the side plate 38 and the top plate 45 downwardly to a centrally disposed, upright baffle plate mounted transversely on the upper face of the main beam 15. These centrally disposed baffle plates may be of different heights. For instance, in Figures 20 and 25 central baffle plates 70 and 71 extend only about one-third of the height of the tank, while in Figures 21, 23 and 24 the transverse baffle plates 72, 73 and 74, respectively, extend the full height of the tank between the longitudinally extending baffle plates 52, 52.

We also find it desirable to provide longitudinal and cross bracing between the side plates 38, 38, preferably between the front and rear truck bearings 17 and 18. For this purpose we provide a series of longitudinally extending T-bars 80 and 81 connected to the inner surfaces of the side plates 38, and connect the opposite pairs of T-bars by a series of cross braces 80$^a$ and 81$^a$, respectively. As will be seen from Figures 16 and 17, the upper cross braces 80$^a$ extend above the longitudinal baffle plates 52, 52, but the lower cross braces 81ᵃ pass through apertures 82 formed in the longitudinal baffle plates 52, 52.

Figure 28:
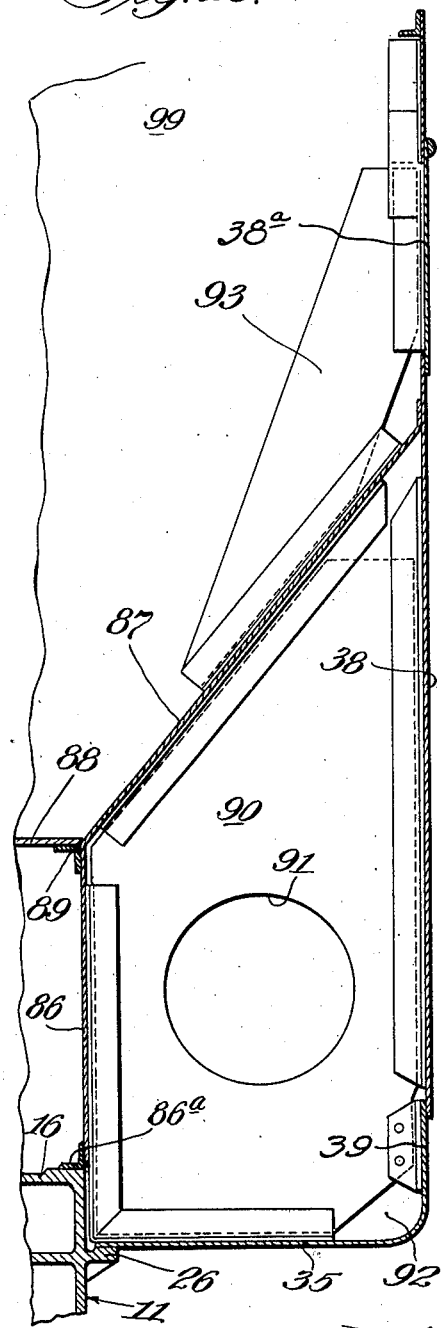

Referring now to the structure at the forward end of the tender comprising the coal space 10ᵇ and the stokerwell 10ᶜ, it will be seen in Figure 17 that the rear end of the stokerwell is defined by an upright transverse plate 85. The sides of said stokerwell are defined by upright plates 86, 86, the latter plates being secured by angle irons 86ᵃ to the elevated machined upper surfaces 16ᵃ of the enlarged portion 16 of the main frame beam 11, at or adjacent the side margins thereof, as shown in Figures 28 and 29.

The upright plates 86, 86 are each preferably integral with diagonal plates 87, 87 which are connected to the side plates 38, 38 and form the two side slope plates for the coal space.

The bottom of the coal space is separated from the stokerwell by the horizontal plate 88 suitably secured as by angle irons 89 at the point of jointure of the upright plates 86 and the side slope plates 87. The stokerwell thus defined is adapted for installation of an automatic stoking apparatus, details of which need not be described, as it forms no part of the present invention. It will be understood, however, that the stokerwell space is equally well adapted to be used as part of the water tank.

It will be observed that the box girder structure formed by the stokerwell space and the side slope plates 87 provides a particularly rigid diagonal bracing between the beam portion 16 and the side plates 38. The spaces on opposite sides of the stokerwell and below the side slope plate 87 form continuations of the water tank. Additional transverse bracing is also provided at points along these last named spaces, as illustrated in Figures 28 and 29.

In Figure 28, a rigid plate 90 occupies substantially the entire cross section of each of the spaces outside of the side plate 86 and below the side slope plate 87, the plate 90 being preferably perforated at 91, and also being cut away at the lower outside corner of the tank to form a water passage 92. It will be especially noted that these rigid plates 90, 90 are opposite the center bearing support 18 for the forward truck 12 so as to provide, with the stokerwell structure, an especially rigid support for the side plates 38 at this point.

In the section shown in Figure 28, a diagonal brace 93 is also provided between the upper surface of side slope plate 87 and the extended portion 38ᵃ of the side plate within the coal space.

In the section shown in Figure 29, a cross plate 94 is connected between the center portion of the side slope plate 87 and the side plate 38 to prevent lateral bulging of said plates. A diagonal brace 95 is also connected between the plate 94 and a corner plate 96 connected between the side plate 86 and the bottom plate 35.

The rear slope plate 99 of the coal space extends from and is supported on the platform 88 and the top of rear plate 85 of the stokerwell, and thence passes upwardly between the side slopes 87 of the coal space and the extended portions 38ᵃ, 38ᵃ of the side plates. This slope plate may be made up of two parts, the lower part 99ᵃ terminating at the top plate 45 of the water tank and the upper part 99ᵇ being continued at the same angle above said top plate 45.

In connection with the water tank structure and the center frame 11, we also provide means whereby said center beam forms a part of the water tank and has communication at points along its side just above the supporting flanges 25, 25 to which the bottom plates 35, 35 are connected, so that all of the water from the tank may be drained into the center beam and carried forwardly therethrough to suitable drainage outlets 103, 103 leading from the bottom of the main beam adjacent the coupling connection at the front end of the main beam.

In the form shown herein, it will be observed that apertures 104, 104 are provided along the sides of both the rear and front sections 15 and 16 to form communication between the water tank and the interior of the hollow beam 11. A series of suitable passages 105, 105 are also provided through the lower portion of the transverse webbing within beam 11 so as to permit the water to pass forwardly therethrough, and be discharged through the drainage openings 103, 103 at the front end of the main beam.

A pipe 103ᵃ is connected to each of the water drainage outlets 103 and leads forwardly and thence laterally to a tank well 103ᵇ suitably mounted as by riveting to the bottom plate 35 and depending below the same at the side of the coupler member 16ᵃ, as seen in Figure 1. An injector or water feed pump (not shown) is mounted as usual with its inlet disposed in said tank well.

It will be understood, of course, that when the stokerwell space 10ᶜ is used for water, the several core holes 107, 107 on the top of the enlarged portion 16 of the main beam may be left open as shown in Figure 7, but when a stoking apparatus is used in the stokerwell, these core holes will be closed by suitable means, as, for instance by plates 108, 108 welded therein, as indicated in Figure 8.

Among the features of a tender frame and tank structure constructed as above described may now be emphasized the following:

The center beam 11 is made of minimum width, its widest part being only as wide as the stokerwell space, thus eliminating side sills, end sills and intermediate bolsters such as utilized in previous constructions and conserving the weight and cost thereof. It will be observed in this connection that the front beam portion 16 is only approximately one-half the entire width of the tank, while the rear beam portion 15 is approximately one-fourth the width of the tank.

It will be noted further that the side flanges or ledges to which the bottom plates are secured may be planed in direct longitudinal lines, which planing operation may be carried out in a simple manner on much narrower planing machines than would be required where end sills, side sills or intermediate bolsters are included in the main frame structure. The same applies to machining operations on the elevated co-planar surfaces 15ᵇ and 16ᵃ on the top of the center beam on which the central tank superstructure elements are mounted.

It will be understood that owing to the much greater depth of the side plates or girders, the deflection thereof due to the suspended weight of the tank and its contents is less than the deflection of the center beam, so that the side plates form the main longitudinal girders for the tender, extending from front to rear of the tank. When properly braced and connected, the side plates, bottom plates and center beam all co-operate to produce the required strength and rigidity of the structure. The provision of substantially solid bulkheads at or adjacent the swivel points for the trucks, together with the intermediate bracing within the tank structure, provides a substantial support for the side plates, through the main beam to the trucks. It will be understood, of course, that the specific forms of diagonal and longitudinal brace structures within the tank may be varied somewhat from those disclosed herein, provided structures of equivalent strengths are substituted therefor.

Another unique feature of our improved design is that provided by the arrangement in the vicinity of the coal space in which the side slope sheets are connected at their bottoms to the main frame casting at the stokerwell space, are cross connected at the top of the stokerwell space and thence extend diagonally to the side plates or girders at the top.

A still further feature in connection with this structure is the cross bracing to prevent lateral bulging of the slope plates or side plates at the sides of the coal space.

The novel method of securing the superstructure to the co-planar upper surfaces 15<sup>b</sup> and 16<sup>a</sup> of the center beam by means of angle irons, welded or otherwise secured thereto, permits of considerable variation in the positioning of the superstructure along said main beam. Similarly the bottom plates may be extended more or less longitudinally of the center beam, so that a given length of beam is suitable for use with tanks of various lengths, widths and weight distribution. This feature has been found to be of particular advantage in adapting old tank structures previously made for use on customary rectangular frames, but altered by utilizing practically everything except the bottoms, and building the old upper portion of the tank on new bottoms made up of the novel cast steel center beam and bottom plates constructed in accordance with our invention. Old tanks of varying widths and lengths may thus be readily adapted for mounting on such cast steel center beam of standard length, by merely redesigning the interior superstructure, regardless of considerable differences in the lengths of the two units, because the tank sheets rest entirely on the machined surfaces provided on the top and sides of the main frame, and there are no upright or laterally extending members on the frame to restrict the location of the old tank to one definite position. For instance, if the tank should come rather long, this should be taken care of by locating the front corner in the correct position and letting the back be slightly farther to the rear than its normal position on the main frame.

The side and back slope sheets of the coal space, where these sheets are fastened to the frame, are also not restricted to any specific location, since said slope sheets may be fastened either directly or indirectly to the frame by means of angle irons which may come a little out of line either sidewise or lengthwise of the enlarged portion 16 of the main beam, without causing any particular difficulty in construction.

It will therefore be understood from the foregoing that the co-planar machined surfaces 15<sup>b</sup> and 16<sup>a</sup> provided on the top of the main frame 11 are not limited to any specific size or arrangement, but may be extended in size so as to accommodate any variations, either laterally or longitudinally, in the positioning of the central tank superstructure thereon.

Our novel arrangement for water drainage from the bottom of the main beam is superior to previous arrangements in which the tank bottom is substantially flat, with the lowest points of water all practically on the same level. In such prior constructions there might be a relatively large quantity of water left in the tank, but when distributed over the entire tank bottom the water would not drain to the tank wells fast enough to maintain a sufficient supply to the injectors or feed pumps, with the result that said pumps would break suction long before the tank was entirely empty.

In our improved construction the main beam 11 forms a part of the water tank, with its bottom considerably below the level of the bottom plates 35, 35, so that said main beam 11 forms in effect a center trough of limited width. Consequently the last few inches of water remaining in the tank will be drained into the main beam 11 so as to be concentrated therein, and will be drained freely therefrom into the tank wells so as to maintain a constant supply of water in the injectors or feed pumps until practically all of the water has been utilized.

It will be observed that so far as the specific structure of the water drainage system is concerned, the trough formed by the main beam 11 can also be formed by other structural elements, as for instance by providing an open depression or trough in the bottom of the tank body which will serve to concentrate and drain relatively small amounts of water remaining in the tank directly to the tank wells. Furthermore, this trough, whether formed at the main beam 11 or otherwise, is preferably disposed longitudinally of the tank floor adjacent the center thereof, so that the center of gravity of the water tank may be reduced to a minimum commensurate with the size of the supporting trucks and the wheels at opposite sides of the trough.

Although we have illustrated and described one particular embodiment of our invention, it will be understood that we do not wish to be limited to the exact construction shown and described, but that various changes and modifications may be made without departing from the spirit and scope of our invention.

We claim:

1. In a locomotive tender frame, a cast steel main frame consisting of a single piece longitudinal beam widened at its front end to form the bottom of a stoker compartment, but otherwise without laterally projecting bolsters, supports or end sills, said main frame forming the sole support for a tank superstructure.

2. In a locomotive tender frame, a cast steel main frame consisting of a single piece longitudinal beam widened at its front end to form the bottom of a stoker compartment, but otherwise without laterally projecting bolsters, supports or end sills, said main frame forming the sole support for a tank superstructure, a pair of flanges formed along the opposite sides of said longitudinal beam below the top thereof, and bottom plates for the tank supported on said flanges.

3. In a locomotive tender frame, a cast steel main frame consisting of a single piece longitudinal beam widened at its front end to form the bottom of a stoker compartment, but otherwise without laterally projecting bolsters, supports or end sills, said main frame forming the sole support for a tank superstructure, a pair of flanges formed at a uniform height along the opposite sides of said longitudinal beam below the top thereof, and bottom plates for the tank supported on said flanges.

4. In a locomotive tender including a water tank, a coal compartment and a stoker compartment, a main frame consisting of a single piece longitudinal beam having its front end portion widened to approximately the same width and length as the stoker compartment, said longitudinal beam forming the sole support for the tank superstructure.

5. In a locomotive tender including a water tank, a coal compartment and a stoker compartment, a main frame consisting of a single piece longitudinal beam having its front end portion widened to approximately the same width and length as the stoker compartment, but otherwise without laterally projecting bolsters, supports or end sills, said longitudinal beam forming the sole support for the tank superstructure.

6. In a locomotive tender including a water tank and a coal compartment at the forward end thereof, having its floor substantially less than the width of the tank and its side and rear walls flaring outwardly therefrom, a main frame consisting of a single piece longitudinal beam having its front end portion widened to approximately the same width and length as said floor of the coal compartment.

7. In a locomotive tender including a water tank and a coal compartment at the forward end thereof, having its floor substantially less than the width of the tank and its side and rear walls flaring outwardly therefrom, a main frame consisting of a single piece longitudinal beam having its front end portion widened to approximately the same width and length as said floor of the coal compartment, and upright longitudinal plates rigidly supporting the margins of said coal compartment floor with the side margins of said widened beam portion.

8. In a locomotive tender including a water tank and a coal compartment at the forward end thereof, having its floor substantially less than the width of the tank and its side and rear walls flaring outwardly therefrom, a main frame consisting of a single piece longitudinal beam having its front end portion widened to approximately the same width and length as said floor of the coal compartment, and upright longitudinal plates continuous with said flared side plates of the coal compartment and rigidly supporting the margins of said coal compartment floor from the side margins of said widened beam portion.

9. In a locomotive tender including a water tank, a coal compartment and a stoker compartment beneath said coal compartment, a main frame consisting of a single piece longitudinal beam having its front end portion widened to approximately the same width and length as the stoker compartment, and a pair of longitudinal upright plates connected between the lateral margins of said widened beam portion and the floor of said coal compartment to define the side walls of said stoker compartment.

10. In a locomotive tender including a water tank, a coal compartment and a stoker compartment beneath said coal compartment, a main frame consisting of a single piece longitudinal beam having its front end portion widened to approximately the same width and length as the stoker compartment, and a pair of longitudinal upright plates connected between the lateral margins of said widened beam portion and the floor of said coal compartment to define the side walls of said stoker compartment, and said plates continuing diagonally outwardly to the side walls of the water tank to define the side slope plates of said coal compartment.

11. In a locomotive tender, a cast steel main frame consisting of a single piece longitudinal beam of box girder construction forming the sole support for a tank superstructure, a pair of flanges formed along the opposite sides of said longitudinal beam intermediate the top and bottom thereof, bottom plates for the tank superstructure supported on said flanges, said longitudinal beam having apertures in the sides thereof above said flanges to afford communication from the tank to the interior of said beam so that the latter forms a part of the water tank extending below said tank bottom plates.

12. In a lomocotive tender, a cast steel main frame consisting of a single piece longitudinal beam of box girder construction forming the sole support for a tank superstructure, a pair of flanges formed along the opposite sides of said longitudinal beam intermediate the top and bottom thereof, bottom plates for the tank superstructure supported on said flanges, said longitudinal beams having apertures in the sides thereof above said flanges to afford communication from the tank to the interior of said beam so that the latter forms a part of the water tank extending below said tank bottom plates, and water discharge connections at the forward end of said beam also below said tank bottom plates.

13. In a locomotive tender, a cast steel main frame consisting of a single piece longitudinal beam of box girder construction, a water tank mounted thereon and solely supported thereby above the bottom of said beam, means affording communication from the tank to the interior of said main frame casting so that said casting forms a part of the water tank, and water discharge connections at the forward end of said beam below the bottom of said tank superstructure.

14. A locomotive tender, including a water tank at the rear end and a coal compartment at the front end, a single piece longitudinal beam forming the sole support for said tank and coal compartment, said beam being of box girder structure extending below the bottom of said water tank, and having passages communicating between said tank and extending forwardly beneath said coal compartment to discharge connections at the front end of said beam.

15. In a locomotive tender, a main frame consisting of a single piece longitudinal beam without bolsters or end sills and forming the sole support for a tank superstructure, said beam being widened adjacent its front end to approximately one-half the total width of the tank and having a rear end portion substantially one-fourth of the total width of the tank.

16. In a locomotive tender, a main frame consisting of a single piece longitudinal beam without bolsters or end sills and forming the sole support for a tank superstructure, said beam being widened adjacent its front end to approximately one-half the total width of the tank superstructure and having a rear end portion substantially one-fourth of the total width of the tank superstructure, said tank superstructure including bottom plates connected to the sides of the beam below the top thereof, side plates connected along the outer margins of said bottom plates, and a plurality of transverse bracing structures extending between the side plates and supported on said main frame.

17. In a locomotive tender, a main frame consisting of a single piece longitudinal beam without bolsters or end sills and forming the sole support for a tank superstructure, said beam having a plurality of pivotal bearing supports for the tender trucks, and a tank superstructure including bottom plates connected to the sides of the beam below the top thereof, side plates connected along the outer margins of said bottom plates, and a plurality of transverse bracing structures extending between opposite side plates and supported on said main frame, the transverse bracing structures adjacent the pivotal truck supports including rigid upright plates connected between the side walls, the bottom plates and main frame beam within the tank structure.

18. In a locomotive tender, a main frame consisting of a single piece longitudinal beam without bolsters or end sills and forming the sole support for a tank superstructure, said beam having a plurality of pivotal bearing supports for the tender trucks, and a tank superstructure including bottom plates connected to the sides of the beam below the top thereof, side plates connected along the outer margins of said bottom plates, and a plurality of transverse bracing structures extending between opposite side plates and supported on said main frame, the transverse bracing structures adjacent the pivotal truck supports including rigid upright plates connected between the side walls, the bottom plates and main frame beam within the tank structure, and a plurality of intermediate transverse baffle plates arranged alternately adjacent the side plates and the center frame beam, respectively.

19. In a locomotive tender, a main frame consisting of a single piece longitudinal beam without bolsters or end sills and forming the sole support for a tank superstructure, said beam having a plurality of pivotal bearing supports for the tender trucks, and a tank superstructure including bottom plates connected to the sides of the beam below the top thereof, side plates connected along the outer margins of said bottom plates, a plurality of transverse bracing structures extending between opposite side plates and supported on said main frame, the transverse bracing structures adjacent the pivotal truck supports including rigid upright plates connected between the side walls, the bottom plates and main frame beam within the tank structure, and a pair of upright baffles disposed longitudinally within said tank on opposite sides of said main beam.

20. In a locomotive tender, a main frame consisting of a single piece longitudinal beam without bolsters or end sills and forming the sole support for a tank superstructure, said beam having a plurality of pivotal bearing supports for the tender trucks, and a tank superstructure including bottom plates connected to the sides of the beam below the top thereof, side plates connected along the outer margins of said bottom plates, a plurality of transverse bracing structures extending between opposite side plates and supported on said main frame, the transverse bracing structures adjacent the pivotal truck supports including rigid upright plates connected between the side walls, the bottom plates and main frame beam within the tank structure, a pair of upright baffles disposed longitudinally within said tank on opposite sides of said main beam, and a plurality of intermediate transverse baffle plates arranged alternately along opposite sides of the space defined between each of said side plates and its adjacent longitudinal baffle plate.

21. In a locomotive tender, a cast steel main frame consisting of a single piece longitudinal beam of box girder construction forming the sole support for a tank superstructure, bottom plates for the tank superstructure connected to said beam above the bottom thereof, means affording communication from the tank to the interior of said main frame casting so that said casting forms a part of the water tank, a tank well supported on and extending below said tank bottom plates adjacent the front end of said tank structure and communicating therewith, and an auxiliary conduit extending between said tank well and said longitudinal beam below the bottom of said tank bottom plates.

22. In a locomotive tender, a cast steel main frame consisting of a single piece longitudinal beam of box girder construction, a tank superstructure mounted thereon and solely supported thereby, said tank superstructure including substantially horizontal bottom plates secured to the sides of said beam intermediate the top and bottom thereof, and means affording communication between said tank superstructure and the interior of said main frame casting so that the latter forms a part of the water tank extending below the bottom of said tank superstructure.

23. In a locomotive tender, a cast steel main frame consisting of a single piece longitudinal beam of box girder construction, a tank superstructure mounted thereon and solely supported thereby, said tank superstructure including substantially horizontal bottom plates secured to the sides of said beam intermediate the top and bottom thereof, said beam having a plurality of apertures along the sides thereof and above said tank bottom plates affording communication between said tank superstructure and the interior of said main frame casting so that the latter forms a part of the water tank extending below the bottom of said tank superstructure.

AUGUSTINE R. AYERS.
GEORGE S. VAIL.